Nov. 20, 1956  P. S. MACGREGOR ET AL  2,771,090
LIQUID FLOW CONTROL SYSTEMS

Filed Dec. 28, 1951  3 Sheets-Sheet 1

Inventors
Peter S. Macgregor
Charles H. Smith,
By
Attorney

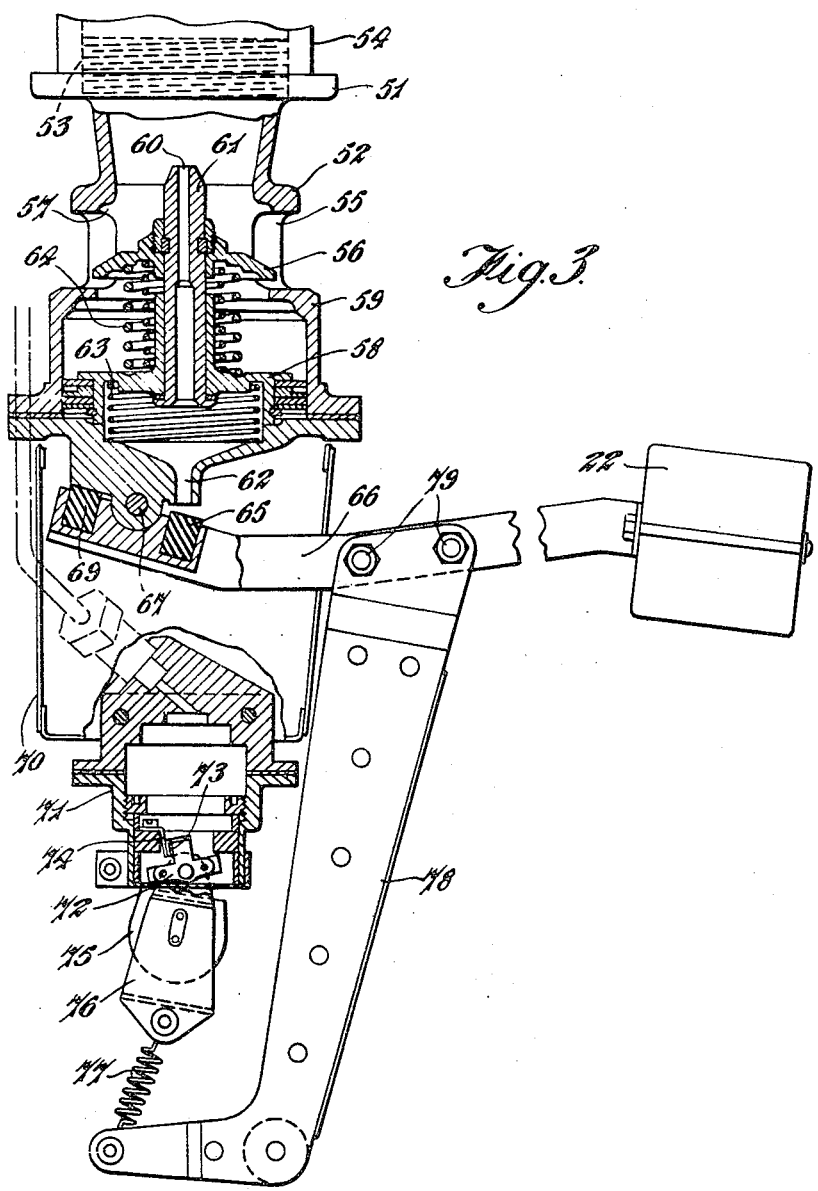

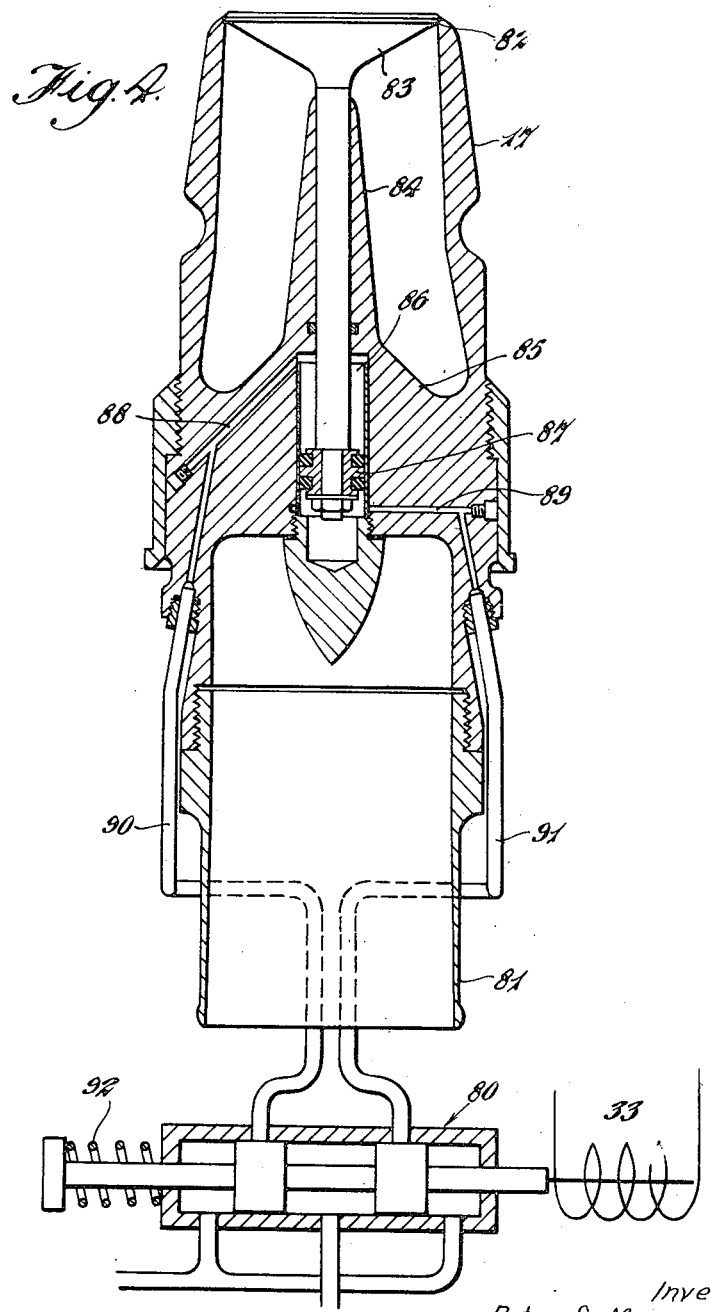

United States Patent Office 2,771,090
Patented Nov. 20, 1956

2,771,090

LIQUID FLOW CONTROL SYSTEMS

Peter Stevens Macgregor, Upton, Poole, England, and Charles Harry Smith, Danbury, Conn., assignors to Flight Refuelling Limited, Tarrant Rushton Airfield, near Blandford, England Application December 28, 1951, Serial No. 263,896

Claims priority, application Great Britain October 12, 1951

12 Claims. (Cl. 137—390)

This invention relates to liquid flow control systems especially for controlling the filling of tanks and like receptacles such as the fuel tanks of aircraft. An important application of the invention is to the refuelling of aircraft in the air by supplying fuel from a tanker aircraft.

The main object of the invention is to provide a flow control system which permits the supply of liquid at a high rate during the greater part of a filling operation, the rate of flow being automatically reduced towards the end of the operation to avoid the risk of hydraulic hammer and high flick pressures being developed when the flow is finally stopped.

The system according to the invention comprises essentially a shut-off valve closed automatically when the filling of a tank or receptacle is completed, a flow control valve in the liquid supply conduit which is by-passed by an additional conduit in which a flow restricting device is mounted, and means controlled by the liquid in the tank or receptacle for closing the flow control valve before the tank or receptacle is completely full.

The accompanying drawings show a flow control system according to the invention for use in an aircraft adapted to receive liquid fuel from another aircraft in flight, and are given by way of example only.

In the drawings:

Figure 3 is a sectional elevation of the float mechanism provided in each tank or receptacle, together with the switch and valve controlled thereby; and Figure 4 is a sectional elevation of the probe shown diagrammatically in Figure 1.

Figure 1:
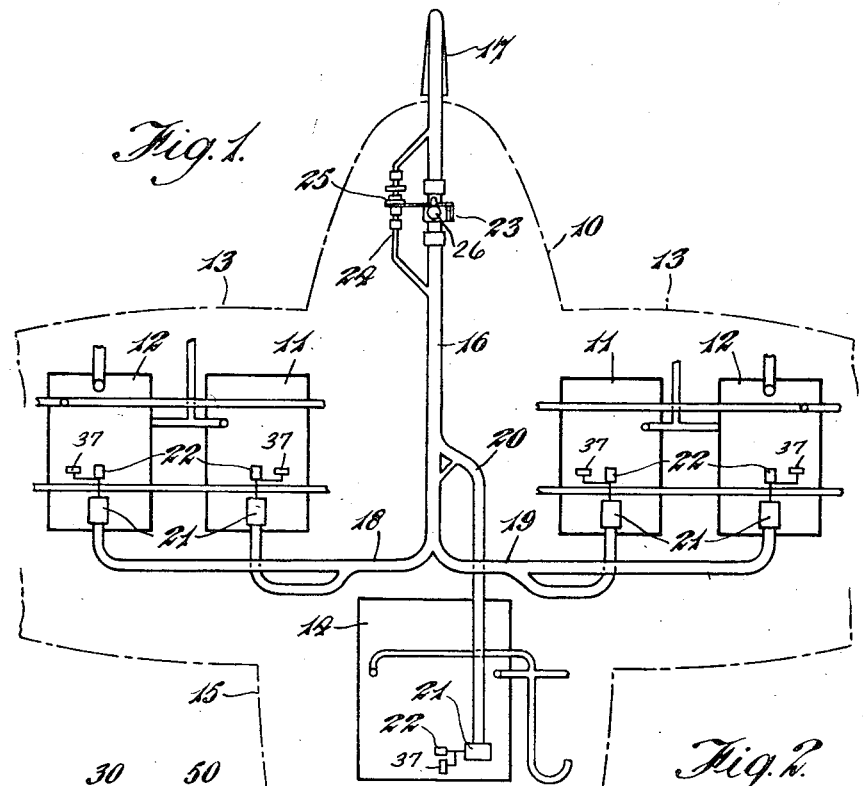
Figure 1 is a diagrammatic representation of an aircraft including the fuel tanks and flow control system.

Referring to the drawings, the reference 10 in Figure 1 indicates an aircraft part of the outline of which is shown, the aircraft having an inner fuel tank 11 and an outer fuel tank 12 in each wing 13, and having also a fifth fuel tank 14 in the fuselage 15. A fuel supply conduit 16 leads from a probe 17 mounted on the nose of the aircraft, and branches into conduits 18, 19 and 20, the conduit 18 leading to the tanks 11 and 12 in the port wing, the conduit 19 to the tanks 11 and 12 in the starboard wing, and the conduit 20 to the tank 14 in the fuselage. Each tank is connected to its supply conduit branch through a valve 21, controlled by a float 22 in the tank in such a way as to cut off the flow of fuel into the tank automatically when the tank is full. One of these valves is shown in detail in Figure 3. In the fuel supply conduit 16 there is interposed a flow control valve 23 which consists of a valve capable of completely closing the conduit, the valve 23 being by-passed by a conduit 24 of smaller diameter than the conduit 16, there being a restricting device 25 in the conduit 24. The probe 17 is provided with a shut-off valve which is shown in detail in Figure 4.

The flow control valve 23 is opened and closed by an electric motor 26, and the probe shut-off valve is opened and closed by air pressure means (described hereinafter) the air pressure being controlled by a solenoid operated valve.

Figure 2:
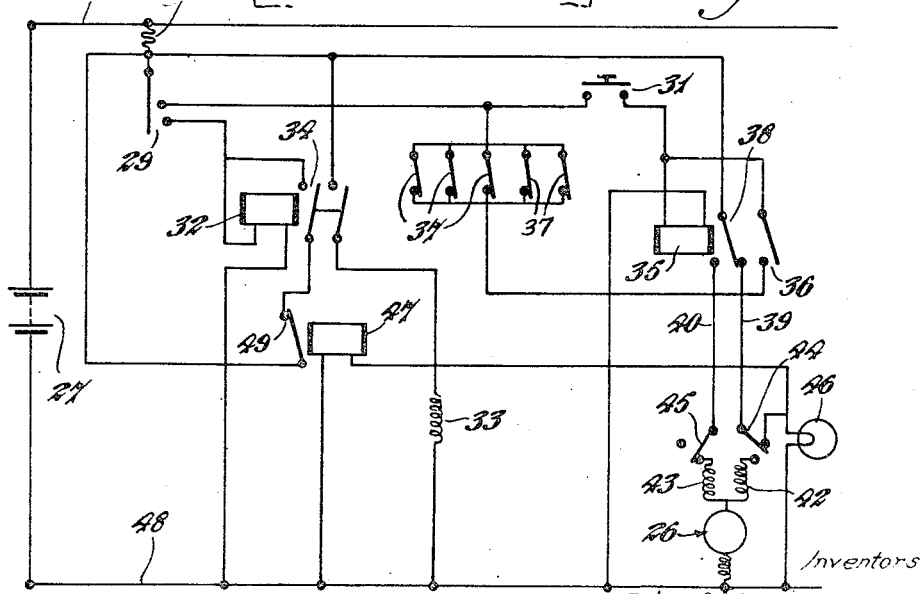
Figure 2 is an electrical diagram of the system.

Figure 2 shows the electrical circuit of the system, the circuit being connected to the positive and negative poles respectively of a direct current supply shown as a battery 27. A main switch 29, when closed, connects the positive lead 30 to one contact of a push-button switch 31, and also closes the circuit of a relay 32 which in turn closes the circuit of the solenoid 33 for opening the probe valve, and at the same time closes a pair of holding contacts 34 in its own circuit. The closing of the push-button switch 31 energizes another relay 35, hereinafter called the reversing relay, which in turn closes contacts 36 in a holding circuit including also five switches 37 arranged in parallel, each of the switches 37 being controlled by the float 22 in one of the fuel tanks so as to be kept closed until the tank is nearly full, and opened before the valve 21 of that tank is closed. The relay 35 also controls a moving contact 38 which, when the relay is de-energized connects a line 39 to the positive lead 30 and, when the relay is energized, connects a line 40 to the said positive lead. The two lines 39 and 40 lead to the electric motor 26 each being connected to one of two opposed field windings 42 and 43, so that the direction of rotation of the motor depends on which of the lines 39 and 40 is in circuit. Current in the field winding 43 causes the motor to rotate in a direction to open the flow-control valve, while current in the field winding 42 causes the motor to close the flow control valve. Switches 44 and 45, mechanically operated by the motor, act, after a predetermined movement in one direction, to break the circuit in the line 39 or 40 through which the motor has been receiving current, and to connect the other of those two lines to the motor, so that it is ready to start up in the opposite direction upon the next operation of the reversing relay.

The switch 44, when in the position in which it disconnects the field winding 42 from the line 39, connects that line through an indicator light 46 and a relay 47 to the negative lead 48, so that the indicator lamp lights, and the relay 47 is energized, when the flow control valve is closed. Energisation of relay 47 opens contacts 49 in series with the contacts 34. A fuse is provided at 50.

When the main switch 29 is open, and the tanks of the aircraft contain only a small quantity of fuel, the relays 32, 35 and 47 are de-energized, the electric motor connections are as shown in Figure 2, so that it is ready to open the flow control valve when the reversing relay 35 is energized, and the switches 37 are closed.

To supply fuel to the aircraft, the probe 17 is first brought into mating contact with a supply conduit on a tanker aircraft.

Closing of the main switch 29 energises the relay 32, thus opening the valve in the probe 17 by energising the solenoid 33, and connecting one side of the push-button switch 31 to the positive side of the supply. If the switch 31 is then closed momentarily, the reversing relay 35 is energised, completing its own holding circuit by closing the contacts 36, and connecting the line 40 to the positive pole of the supply through the contact 38. The indicator light 46 is thus extinguished and the relay 47 de-energised, and the motor 26 runs in a direction to open the flow control valve. When the valve is fully open, the switches 44 and 45 are changed over, leaving the motor disconnected from the line 40 and connected to the line 39. This condition remains until the tanks are nearly full of fuel, when the switches 37 are opened by the floats in the respective tanks. When all of the switches 37 have opened, the holding circuit of the reversing relay 35 is broken, and the moving contact 38 therefore moves back to the position shown in Figure 2, starting up the motor 26 in the direction to close the flow control valve, and the motor continues to run in this direction until the flow control valve is closed and the switches 44 and 45 changed over, the latter bringing the lamp 46 and relay 47 into operation. Delivery of fuel continues, during and after the closing of the flow control valve, through the by-pass conduit 24, until the float-actuated valves on the various tanks are closed by the completion of the filling of the tanks. The main switch 29 is then opened to close the valve in the probe 17, and the probe is released from the supply conduit of the supplying aircraft.

It will be seen that to provide normal operation of the system the main switch must be kept closed. Should this switch be inadvertently allowed to open during a fuelling operation, the reversing relay 35 will be de-energised, and the flow control valve will start to close. The relay 32 will be kept energised through its holding contacts 34 until the flow control valve is closed, since the relay 47 will be de-energised and the contacts 49 will be closed. The valve in the probe 17 will thus be held open until the flow control valve has closed, and will not close under maximum flow conditions.

Figure 3 shows one of the valves 21 together with its operating float 22 and the associated switch 37, the whole unit being mounted in one of the fuel tanks 11, 12 or 14 by means of a flange 51 which seats on the edge of a hole formed in the top of the tank. The valve 21 comprises a body 52 screwed at 53 into a sleeve 54 integral with the flange 51, the supply conduit 18, 19 or 20 being connected to the outer end of the sleeve 54. Entry of fuel into the tank through ports 55 in the valve body is controlled by a valve closure member 56 seating at 57 in the body, the member 56 being mounted on a piston 58 of larger area than the member 56 and slidable in a chamber 59. The chamber 59 is connected by a passage 60 in a stem 61 carrying the member 56, to the inlet side of the member 56, and by orifice 62 to the interior of the tank. The piston 58 is urged in a direction to close the valve by a light spring 63, and the valve closure member 56 is capable of limited axial movement relative to the piston, the two being urged apart by springs 64. The orifice 62 is controlled by a buffer 65 mounted on a float arm 66 pivoted at 67 on the valve body, and carrying a float 22. The arrangement is such that, when the tank is full, the float 22 is lifted to bring the buffer 65 against the mouth of the orifice 62, thus disconnecting the chamber 59 from the tank, so that fuel flowing into the said chamber through the passage 60 lifts the piston and causes valve closure member 56 to engage its seat, thus closing the valve. A second buffer 69 is provided on the float arm 66 to engage the valve body when the float falls.

A pair of plates 70 depending from the valve body 52 carry a switch casing 71 which houses the switch 37, the switch consisting of a rocking armature 72 of magnetic material carrying a moving contact 73, a fixed contact 74, and a horse-shoe magnet 75 pivotally mounted externally of the casing, and acting, as its position is changed, to rock the armature so as to open and close the switch contacts. The magnet 75 is carried by a rocking member 76 connected by a tension spring 77 to an L-shaped arm 78 bolted at 79 to the float arm, so that the point of connection between the spring 77 and the arm 78 moves in the plane of movement of the rocking member 76 as the float moves up and down. The arrangement is such that when the float 22 is unsupported by the liquid, the parts are in the position shown in the drawing, and the switch 37 is closed, the line of action of the spring changing as the float rises until, at some selected level of fuel in the tank, before it is completely full, the rocking member 76 is caused to rock to the right, as a result of which movement the armature is rocked by the magnet to its other position, and the switch opened.

Figure 4 shows the probe 17 in section, so as to disclose details of the shut-off valve therein, and also shows, diagrammatically at 80, the valve operated by the solenoid 33. The probe has a tubular body connected at one end, through an adaptor 81, to the conduit 16 (not shown) and tapered at its other end to enter a socket on the end of the conduit carried by the fuel-supply aircraft. A seat 82 is formed around the tapered end to receive a mushroom valve head 83 the stem of which is slidable in a guide 84 carried by a spider 85 in the body, the stem extending into a cylinder 86 in the spider and carrying a piston 87 which is a fluid-tight fit in the cylinder. Passages 88 and 89 in two opposite arms of the spider 85 lead respectively into the two ends of the cylinder 86, and are connected by conduits 90 and 91 respectively to the valve 80, which, in one position, connects the conduit 90 to a compressed air supply and the conduit 91 to exhaust, and, in another position connects the conduit 91 to the compressed air supply, and the conduit 90 to exhaust. Connection of the conduit 91 to the compressed air supply opens the shut off valve 83, and the selector valve is moved to the position to make this connection by energising the solenoid 33, being returned to the other position when the solenoid is de-energised, by a spring 92.

We claim:

1. A liquid flow control system comprising a tank, liquid passage means in communication with said tank for supplying liquid under pressure to said tank, a shut-off valve in said passage means and operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including float means in said tank and connected with said shut-off valve for closing such valve when the tank is full and means connecting said float means with said flow-control valve for closing said latter valve as the liquid level rises in the tank and prior to the closing of the shut-off valve to reduce flow through said passage means and prevent liquid hammer when said passage means is closed by said shut-off valve.

2. A liquid flow control system comprising a tank, liquid passage means in communication with said tank for supplying liquid under pressure to said tank, a shut-off valve in said passage means and operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including manually operated means for opening said valves, float means in said tank and connected with said shut-off valve for closing such valve when the tank is full and means connecting said float means with said flow-control valve for closing said latter valve as the liquid level rises in the tank and prior to the closing of the shut-off valve to reduce flow through said passage means and prevent liquid hammer when said passage means is closed by said shut-off valve.

3. A liquid flow control system comprising a tank, a liquid passage in communication with said tank for supplying liquid under pressure to said tank, a shut-off valve in said passage, a flow control valve in said passage, both said valves being operable between open positions permitting maximum flow through said passage and closed positions stopping all flow through said passage, a by-pass connecting said passage around said flow control valve and establishing a reduced flow through said passage when the flow-control valve is closed, and means for opening and closing said valves and including float means in said tank connected with said shut-off valve for closing such valve when the tank is full and means connecting said float means with said flow-control valve for closing said latter valve as the liquid level rises in the tank and prior to the closing of the shut-off valve to reduce flow through said passage and prevent liquid hammer when said passage is closed by said shut-off valve.

4. A liquid flow control system comprising a tank, a liquid passage in communication with said tank for supplying liquid under pressure to said tank, a shut-off valve in said passage, a flow-control valve in said passage, both said valves being operable between open positions permitting maximum flow through said passage and closed positions stopping all flow through said passage, a by-pass connecting said passage around said flow-control valve and establishing a reduced flow through said passage when the flow-control valve is closed, and means for opening and closing said valves and including float means in said tank connected with said shut-off valve for closing such valve when the tank is full, an electric motor drivingly connected with said flow-control valve for operating the latter valve, first switch means connected to said motor for opening said flow-control valve, and second switch means connecting said float means with said motor for closing said flow-control valve as the liquid level rises in the tank and prior to the closing of the shut-off valve to reduce flow through said passage and prevent liquid hammer when said passage is closed by said shut-off valve.

5. A liquid flow control system comprising a tank, liquid passage means in communication with said tank for supplying liquid under pressure to said tank, a shut-off valve in said passage means and operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including float means in said tank and connected with said shut-off valve for closing such valve when the tank is full, a reversible electric motor drivingly connected with said flow-control valve for operating the latter valve, reversing switch means connected to and controlling said motor, manually operated means for actuating said switch means to operate said motor and open said flow-control valve, and means connecting said float means with said reversing switch means for actuating said switch means to operate said motor and close said flow-control valve as the liquid level rises in the tank and prior to the closing of the shut-off valve to reduce flow through said passage means and prevent liquid hammer when said passage means is closed by said shut-off valve.

6. A liquid flow control system comprising a tank, liquid passage means in communication with said tank for supplying liquid under pressure to said tank, a shut-off valve in said passage means and operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including float means in said tank and connected with said shut-off valve for closing such valve when the tank is full, a reversible electric motor drivingly connected with said flow-control valve for operating the latter valve, reversing switch means connected to and controlling said motor, a relay for operating said reversing switch means, manually operated switch means in circuit with said relay and upon closing said circuit energizing said relay to actuate said reversing switch means in one direction to energize said motor for opening said flow-control valve, and switch means operatively connected with said float means and in circuit with said relay for deenergizing said relay and place said reversing switch and motor in circuit for closing said flow-control valve as the liquid level rises in the tank and prior to the closing of the shut-off valve to reduce flow through said passage means and prevent liquid hammer when said passage means is closed by said shut-off valve.

7. A liquid flow control system comprising a tank, liquid passage means in communication with said tank for supplying liquid under pressure to said tank, first and second shut-off valves in said passage means and operable between open position permitting maximum flow and closed position stopping all flow through said passage means, a flow-control valve in said passage means between said shut-off valves and operable between open position permitting maximum flow through said passage means and a closed position establishing a reduced flow through said passage means, and means for opening and closing said valves and including float means in said tank and operatively connected with said second shut-off valve for closing such valve when the tank is full, a reversible electric motor drivingly connected with said flow-control valve for operating the latter valve, reversing switch means controlling said motor, an electric circuit including a relay for operating said reversing switch means, manually operated switch means for closing said circuit and energizing said relay to actuate said reversing switch means in one direction to energize said motor for opening said flow-control valve, switch means operatively connected with said float means and in said circuit for deenergizing said relay to place said reversing switch and motor in circuit for closing said flow-control valve as the liquid level rises in the tank and prior to the closing of the shut-off valve to reduce flow through said passage means and prevent liquid hammer when said passage means is closed by both said shut-off valves, solenoid means for operating said first shut-off valve, and second manually operated switch means controlling said solenoid means and including contacts in series with the first said manually operated switch means, whereby said flow-control valve can be opened only when said second manually operated switch means is closed.

8. A liquid flow control system comprising a plurality of tanks, liquid passage means in communication with said tanks for supplying liquid under pressure to said tanks, a plurality of shut-off valves in said passage means and including one shut-off valve for each tank, said shut-off valves being operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including float means in each tank and connected with the shut-off valve for each tank for closing such valve when the respective tank is full and means operatively connecting said float means with said flow-control valve for closing said flow-control valve as the liquid level rises in the tank and prior to the closing of all of the shut-off valves to reduce flow through said passage means and prevent liquid hammer when said passage means is completely closed by said shut-off valves.

9. A liquid flow control system comprising a plurality of tanks, liquid passage means in communication with said tanks for supplying liquid under pressure to said tanks, a plurality of shut-off valves in said passage means and including one shut-off valve for each tank, said shut-off valves being operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including float means in each tank and connected with the shut-off valve for each tank for closing such valve when the respective tank is full, an electric motor drivingly connected with said flow-control valve for operating the latter valve, an electric circuit controlling said motor, and switch means in said motor control circuit and operatively connected with said float means, said switch means including a plurality of switches each connected to the float means in one of said tanks and placing said motor in circuit for closing said flow control valve upon actuation of all of said switches as the liquid level rises in the tanks and prior to the closing of all of said shut-off valves to reduce flow through said passage means and prevent liquid hammer when said passage means is completely closed by said shut-off valves.

10. A liquid flow control system comprising a plurality of tanks, liquid passage means in communication with said tanks for supplying liquid under pressure to said tanks, a plurality of shut-off valves in said passage means and including one shut-off valve for each tank, said shut-off valves being operable between open position permitting maximum flow and closed position stopping all flow through said passage means, a flow control valve in said passage means and operable between open position permitting maximum flow through said passage means and a closed position establishing a reduced flow through said passage means, and means for opening and closing said valves and including float means in each tank and connected with the shut-off valve for each tank for closing such valve when the respective tank is full, a reversible electric motor drivingly connected with said flow-control valve for operating the latter valve, reversing switch means controlling said motor, an electric circuit including a relay for operating said reversing switch means, manually operated switch means for closing said circuit and energizing said relay to actuate said reversing switch means in one direction to energize said motor for opening said flow-control valve, and switch means operatively connected with said float means and in circuit with said relay, said latter switch means including a plurality of switches each connected to the float means in one of said tanks and arranged in parallel in said circuit for de-energizing said relay upon actuation of all of said switches and placing said reversing switch and motor in circuit for closing said flow-control valve as the liquid level rises in the tank and prior to the closing of all of the shut-off valves to reduce flow through said passage means and prevent liquid hammer when said passage means is completely closed by said shut-off valves.

11. A liquid flow control system comprising a plurality of tanks, liquid passage means in communication with said tanks for supplying liquid under pressure to said tanks, a plurality of shut-off valves in said passage means and including one shut-off valve for each tank and a shut-off valve common to all said tanks, said shut-off valves being operable between open position permitting maximum flow and closed position stopping all flow through said passage means, a flow control valve in said passage means and operable between open position permitting maximum flow through said passage means and a closed position establishing a reduced flow through said passage means, and means for opening and closing said valves and including float means in each tank and connected with the shut-off valve for each tank for closing such valve when the respective tank is full, a reversible electric motor drivingly connected with said flow-control valve for operating the latter valve, reversing switch means controlling said motor, an electric circuit including a relay for operating said reversing switch means, manually operated switch means for closing said circuit and energizing said relay to actuate said reversing switch means in one direction to energize said motor for opening said flow-control valve, and switch means operatively connected with said float means and in circuit with said relay, said latter switch means including a plurality of switches each connected to the float means in one of said tanks and arranged in parallel in said circuit for de-energizing said relay upon actuation of all of said switches and placing said reversing switch means and motor in circuit for closing said flow-control valve as the liquid level rises in the tank and prior to the closing of all of said shut-off valves including said common shut-off valve to reduce flow through said passage means and prevent liquid hammer when said passage means is completely closed by said shut-off valves.

12. A liquid flow control system comprising a plurality of tanks, liquid passage means in communication with said tanks for supplying liquid under pressure to said tanks, a plurality of shut-off valves in said passage means and including one shut-off valve for each tank and a shut-off valve common to all said tanks, said shut-off valves being operable between open position permitting maximum flow and closed position stopping all flow through said passage means, a flow-control valve in said passage means and operable between open position permitting maximum flow through said passage means and a closed position establishing a reduced flow through said passage means, and means for opening and closing said valves and including float means in each tank and connected with the shut-off valve for each tank for closing such valve when the respective tank is full, a reversible electric motor drivingly connected with said flow-control valve for operating the latter valve, reversing switch means controlling said motor, an electric circuit including a relay for operating said reversing switch means, manually operated switch means for closing said circuit and energizing said relay to actuate said reversing switch means in one direction to energize said motor for opening said flow-control valve, switch means operatively connected with said float means and in circuit with said relay, said latter switch means including a plurality of switches each connected to the float means in one of said tanks and arranged in parallel in said circuit for deenergizing said relay upon actuation of all of said switches and placing said reversing switch means and motor in circuit for closing said flow-control valve as the liquid level rises in the tank and prior to the closing of all of said shut-off valves including said common shut-off valve to reduce flow through said passage means and prevent liquid hammer when said passage means is completely closed by said shut-off valves, solenoid means for operating said common shut-off valve, and second manually operated switch means controlling said solenoid means and including contacts in series with the first said manually operated switch means, whereby said flow-control valve can be opened only when said second manually operated switch means is closed.

References Cited in the file of this patent

UNITED STATES PATENTS

| | | |
|---|---|---|
| 749,645 | Tuttle | Jan. 12, 1904 |
| 1,781,446 | Dornier | Nov. 11, 1930 |
| 1,806,834 | Ullendorff | May 26, 1931 |
| 1,848,372 | Moran | Mar. 8, 1932 |
| 2,061,608 | Beckwith | Nov. 24, 1936 |
| 2,146,729 | Gavin | Feb. 14, 1939 |
| 2,322,658 | Overbeke | June 22, 1943 |
| 2,509,629 | De Giers et al. | May 30, 1950 |
| 2,516,150 | Samiran | July 25, 1950 |
| 2,615,450 | Legge et al. | Nov. 4, 1952 |